US009621742B2

(12) United States Patent
Venkata Prasad Palipi Kandubai et al.

(10) Patent No.: US 9,621,742 B2
(45) Date of Patent: Apr. 11, 2017

(54) DOCUMENT PRINTING

(71) Applicant: HEWLETT-PACKARD DEVELOPMENT COMPANY, L.P., Houston, TX (US)

(72) Inventors: Raghavendra Venkata Prasad Palipi Kandubai, Tirupati (IN); Priyadharshni Uthirapathi, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/907,454

(22) PCT Filed: Jul. 29, 2013

(86) PCT No.: PCT/IN2013/000471
§ 371 (c)(1),
(2) Date: Jan. 25, 2016

(87) PCT Pub. No.: WO2015/015501
PCT Pub. Date: Feb. 5, 2015

(65) Prior Publication Data
US 2016/0182745 A1   Jun. 23, 2016

(51) Int. Cl.
*G06F 15/00* (2006.01)
*G06F 3/12* (2006.01)
*G06K 1/00* (2006.01)
*H04N 1/00* (2006.01)
*G06Q 10/10* (2012.01)

(52) U.S. Cl.
CPC ......... *H04N 1/00212* (2013.01); *G06Q 10/10* (2013.01); *H04N 1/00244* (2013.01); *H04N 1/00307* (2013.01); *H04N 2201/0094* (2013.01)

(58) Field of Classification Search
CPC ........... H04N 1/00212; H04N 1/00244; H04N 1/00307; H04N 2201/0094; G06Q 10/10
USPC ............................... 358/1.1, 1.13, 1.15, 1.14
See application file for complete search history.

(56) References Cited

U.S. PATENT DOCUMENTS

| 8,027,049 B2 | 9/2011 | Kinoshita et al. |
| 8,116,303 B2 | 2/2012 | Toscano et al. |
| 2007/0121147 A1 | 5/2007 | Corona et al. |
| 2007/0177199 A1 | 8/2007 | Okamoto |
| 2008/0239371 A1* | 10/2008 | Sato .................. H04N 1/32117 358/1.15 |
| 2010/0332608 A1* | 12/2010 | Wei .......................... H04L 12/58 709/206 |

(Continued)

FOREIGN PATENT DOCUMENTS

| CN | 1725798 A | 1/2006 |
| CN | 102625016 A | 8/2012 |
| CN | 105710536 A | 10/2012 |

*Primary Examiner* — Douglas Tran
(74) *Attorney, Agent, or Firm* — HP Inc. Patent Department

(57) ABSTRACT

Provided is a method of printing a document. An email message comprising a document for printing is received on a cloud server, wherein the email message includes an email address of a printer and an email address of an additional recipient. The email message is transmitted to the printer and the additional recipient. The document is printed on the printer upon receipt of the email message.

12 Claims, 2 Drawing Sheets

(56) References Cited

U.S. PATENT DOCUMENTS

2014/0324927 A1* 10/2014 Zhang ............... G06F 17/30091
            707/825
2015/0169256 A1*  6/2015 Fujisawa ................ G06F 3/122
            358/1.13

* cited by examiner

DOCUMENT PRINTING

BACKGROUND

Printing has been around for ages. From the invention of a printing press in the fifteenth century to modern day digital printers, printing has evolved from largely a commercial activity to a routine process used by millions of people around the world to print a variety of documents. It is not surprising therefore that printing is a huge business, and companies involved in various print-related activities, such as printer manufacturers, print service providers, etc constantly endeavor to provide end users with a variety of printing related innovative products and solutions.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

People print a variety of documents depending on their requirement. These could be text documents, spreadsheets, images, presentation slides, etc. There could be many scenarios where a user may like to share a document with another individual (such as friends, family, colleagues, etc.) for printing. For example, a manager may want his subordinates or team members to print a report for discussion prior to a meeting. In another example, an instructor may like to share some notes with his students for printing so that they could be brought to the class later.

In either of the abovementioned scenarios, an existing solution for a user who wants to share a document for printing with other users is to save the document in a folder and share the folder with others. Users who want to print the shared document may do so by using their computers to access the shared folder and printing the document individually. In another approach, a user can email the document to other users who are required to retrieve the email and then print the document. In both aforementioned approaches, the users are required to have access to computers, and it takes additional time and effort to locate a document or search an email before a print could be obtained. In addition, in neither of said scenarios, a recipient with whom a document has been shared for printing is aware that the sender himself/herself is printing the document as well. Needless to say, printing of a document by a sender (while sharing it with others) could act as a motivating factor for recipients to print the document as well since it highlights the importance attached to the document for the sender. Thus, an act of printing the document by a sender himself/herself adds value to the document and increases its print relevance in the perception of a receiver.

Proposed is a solution for printing a document. Proposed solution allows a user to send an email with a document to a cloud server for printing. The email message includes the email ID of a printer in the "To" field and email IDs of other recipients in the CC (Carbon Copy) field. The cloud server, upon receiving the email message, transmits the email message to the printer for printing the document and notifies the recipients whose email IDs are in the CC field. In an example, the recipients are devices or users who have registered with the cloud server with their email IDs. The proposed solution thus enables content distribution for printing a user friendly experience and simplifies the printing process for a plurality of people.

Figure 1:
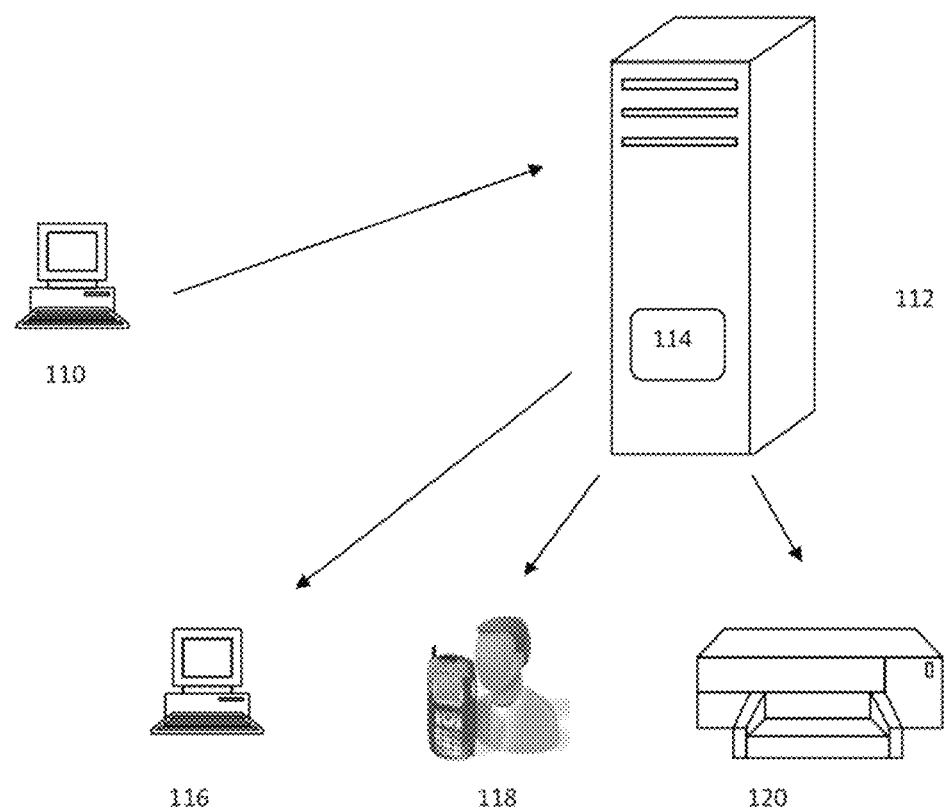
FIG. 1 is a schematic block diagram of a document printing system, according to an example.

FIG. 1 is a schematic block diagram of a document printing system, according to an example.

Document printing system 100 may include source system 110, computer server 112, and recipient systems 116, 118 and 120. Various components of document printing system 100 i.e. source system 110, computer server 112, and recipient systems 116, 118 and 120 could be connected over a network, which may be wired or wireless (for example, a telecom network). The network may be a public network such as the Internet, or a private network such as an intranet.

Source system 110 may be a computing device such as, but not limited to, a desktop computer, a notebook computer, a tablet computer, a computer server, a mobile phone, or a personal digital assistant (PDA). Source systems 110 may be connected to computer server 112 through a communication network which may be wired or wireless. In an implementation, source system 110 may include an email application (machine readable instructions) for sending and receiving email messages. A user ("sender") may use source system 110 to send an email message comprising a document(s) for printing to computer server 112.

Computer server 112 is a computer or computer application (machine executable instruction) that provides services to other computers or computer applications. Computer server 112 may include a processor, a memory, and a communication interface. The components of computer server may be coupled together through a system bus. Processor may include any type of processor, microprocessor, or processing logic that interprets and executes instructions. Memory may include a random access memory (RAM) or another type of dynamic storage device that may store information and instructions non-transitorily for execution by processor. In an implementation, memory may include a print management module 114. Communication interface ma include any transceiver like mechanism that enables computer server 112 to communicate with other devices and/or systems via a communication link. Communication interface may be a software program, a hard ware, a firmware, or any combination thereof. Communication interface may use a variety of communication technologies to enable communication between computer server and another computer system such as source system 110 or any other computing device. To provide a few non-limiting examples, communication interface may be an Ethernet card, a modem, an integrated services digital network ("ISDN") card, etc. Computer server 112 may receive an email message comprising a document(s) for printing sent by a user ("sender") from source system 110.

In an implementation, computer server 112 is a cloud computing server (or cloud server) that offers cloud computing to customers. Generally speaking, cloud computing involves delivery of computing as a service rather than a product, whereby shared resources (software, storage resources, etc.) are provided to computing devices as a service. The resources are shared over a network, which is typically the internet. In an example, print management module 114 is present on cloud server. Print management module 114 is used for processing an email message comprising a document(s) for printing which is received by computer server 112. Print management module 114 may maintain a list of printers which could be used for printing the document(s) received in the email message. Each printer on the list is assigned a unique email address. In an implementation, the unique email addressed is assigned by print management module 114.

Print management module 114 may also maintain a list of additional recipients. Each additional recipient is identifiable with a unique email address assigned to it. Print management module 114 may provide an option for an additional recipient to register its email address.

Recipient systems 116, 118 and 120 may be a computing device such as, but not limited to, a desktop computer, a notebook computer, a tablet computer, a computer server, a mobile phone, or a personal digital assistant (PDA). In an implementation, recipient systems 116, 118 and 120 could be a printing device (for example, recipient system 120). Some non-limiting examples of a printing device may include a dot-matrix printer, an inkjet printer, a laser printer, etc. In addition, a printing device may include a multifunction printer (MFP), also known as multi-function device (MFD), or all-in-one (AIO) printer. In an example, a printing device is a network printer which may be connected to computer server 112 over a Local Area Network (LAN), Wireless Area Network (WAN), or the Internet.

In another example, a printing device is a cloud enabled or cloud ready printer. Cloud enabled printers connect directly to a cloud (for instance, through the Internet) and don't require a computer to setup. They register directly with a cloud service on the Internet and typically always available. In a yet another example, a printing device is an HP ePrint-enabled printer. HP ePrint is a term used by Hewlett-Packard Company to describe a variety of printing technologies developed for mobile computing devices. HP ePrint allows a user to print from virtually anywhere to a printer that supports ePrint. Once enabled, ePrint assigns an email address to a printer. To print, a user simply needs to send an email containing the document to be printed to printers' email address. HP ePrint service will open and print the email and any supported attachments. A user could print images, text documents, spreadsheets, presentations, photos, etc. using ePrint.

In an example, a printing device includes a memory, a processor and a communication unit for communicating with a cloud server. The processor may control the memory and the communication interface. The processor may, upon receipt of an email message comprising a document for printing from a cloud server, wherein the email message includes an email address of the printer in "To" field of the email message and an email address of an additional recipient in "CC" or "BCC" field of the email message, print the document upon receipt of the email message.

In an implementation, recipient systems 116, 118 and 120 may include an email application (machine readable instructions) for sending and receiving email messages.

It would be appreciated that the system components depicted in FIG. 1 are for the purpose of illustration only and the actual components may vary depending on the system and architecture deployed for implementation of the present solution.

Figure 2:
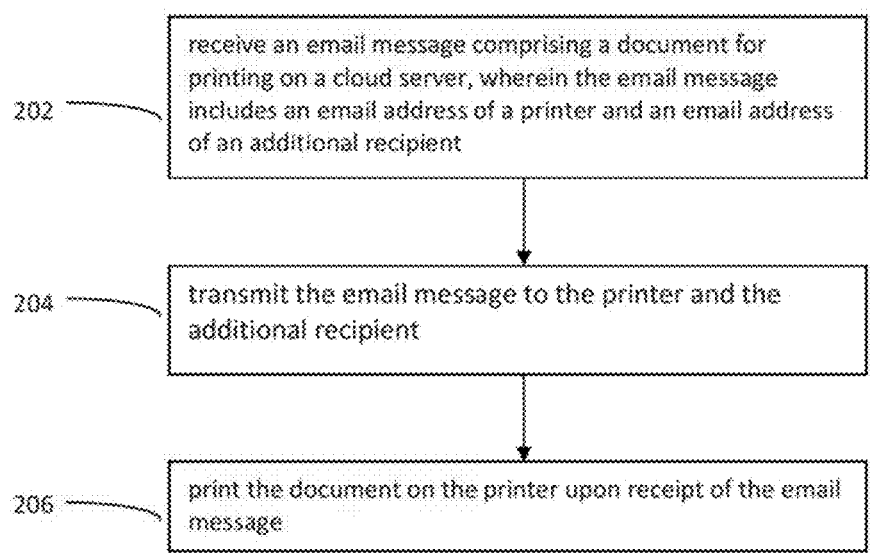
FIG. 2 illustrates a method of printing documents, according to an example.

FIG. 2 illustrates a method of printing documents, according to an example.

At block 202, an email message comprising a document(s) for printing is received on a cloud server. In an example, the email message is sent by a user ("sender") who wants to print the document(s) included in the email message and/or the email message. The email message includes an email address of a printer and an email address of an additional recipient (s). In an example, the email address of the printer is present in "To" field of the email message. And the email address of the additional recipient(s) is/are present in "CC" and/or "BCC" field of the email message.

In an implementation, the cloud server hosts a print management module (or a print service) for processing an email message comprising a document(s) for printing. The print management module maintains a list of printers which could be used for printing a document received in an email message by the cloud server. Each printer on the list is assigned a unique email address which, in an implementation, may be specified by the print management module. The list of printers and their corresponding email addresses (maintained by the print management module) may be visible to a user (sender) of an email message, for example, through a user interface of an application (or a mobile app) on the user's device.

A user can select a printer (from the list maintained by the print management module) for printing a document attached with an email message by including the email address of the selected printer in the "To" field of the email message. In another scenario, for instance when a user may like to use a printer which is not on the said list, a user can also register a printer of his/her choice with the print management module. Once registered, the printer could be used for printing a document attached with an email message.

The print management module may also maintain a list of additional recipients. Each additional recipient is identifiable with a unique email address assigned to it. The print management module may also provide an option for an additional recipient to register its email address.

An additional recipient may be a computing device such as, but not limited to, a desktop computer, a notebook computer, a tablet computer, a computer server, a mobile phone, a personal digital assistant (PDA), or a printing device. The term "additional recipient" may also be referred to include a user or an individual.

At block 204, the email message is transmitted to the printer and the additional recipient. In other words, the email message comprising a document for printing is transmitted to the printer whose email address is present in the email message. The email message comprising a document(s) for printing is also transmitted to the additional recipient(s) whose email address is/are present in the email message. In an implementation, each additional recipient is registered with a print management module on the cloud server for receiving an email message comprising a document for printing. In case an email message addressed to an additional recipient (registered with the print management module) is received by the cloud server, a notification regarding such message is sent to the addressed recipient. In an implementation, said notification is displayed on a display present on an additional recipient system or device. For instance, if the additional recipient is a printing device, the notification may appear on the printing device's control panel. The aforesaid notification could be of different types. By way of example, and not limitation, such notification may include a visual alarm (for example, a pop-up message), an audio alarm (for example, a beep sound), and a vibration alarm on the additional recipient's device. In another implementation, said notification provides an option to a recipient to print, save, and/or discard the document present in the email message. A recipient may print the document by selecting an appropriate printer from his/her computing device.

At block 206, the document(s) included in the email message is/are printed by the printer whose email address is present in the email message. In other words, the document(s) is/are printed by the printer whose email address is presented in "To" field of the email message.

If the additional recipient is a printing device, the document(s) included in the email message is/are also printed on said printing device. In other words, the document(s) is/are printed by the printing device whose email address is presented in "CC" and/or "BCC" field of the email message. It may be noted that said printing device may be different from the printer whose email address is presented in "To" field of the email message.

In an implementation, the cloud server maintains a database of all the documents printed using the print management module along with the email IDs of the sender and the recipients in the email messages. If a sender or recipient of an email message comprising a document wants to access or print a document in the future, he/she may use cloud enabled printer or any device with an interface to the print management module on the cloud server to access and print that document.

Solution described in this application may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising transitory or non-transitory processor-readable media for carrying or having computer-executable instructions or data structures stored thereon. Such processor-readable media can be any available media that can be accessed by a general purpose or special purpose computer. By way of example, such processor-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

For the sake of clarity, the term "module", as used in this document, may mean to include a software component a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A method of printing a document, comprising:
receiving an email message comprising a document for printing on a cloud server, wherein the email message includes an email address of a printer in a "To" field of the email message and an email address of an additional recipient present in a "CC" or a "BCC" field of the email message;
transmitting the email message to the printer and the additional recipient;
printing the document on the printer upon receipt of the email message, and
providing a notification related to the email message to the additional recipient, wherein the notification provides an option to a user to print, save or discard the document present in the email message.

2. The method of claim 1, wherein the additional recipient is a printer.

3. The method of claim 2, further comprising printing the document on the printer.

4. The method of claim 1, wherein the additional recipient is a user.

5. The method of claim 4, further comprising printing the document upon request from the user.

6. The method of claim 4, wherein the user receives the email message on a computing device.

7. The method of claim 1, wherein the additional recipient includes one of: a mobile phone, a Portable Digital Assistant (PDA), a fax machine, a tablet, a desktop and a notebook computer.

8. The method of claim 1, wherein the additional recipient is registered with the cloud server.

9. The method of claim 1, wherein the additional recipient is registered with the cloud server for receiving the email message comprising a document for printing.

10. The method of claim 1, wherein the document is included as an attachment to the email message.

11. A printer, comprising:
a memory;
a communication unit for communicating with a cloud server; and
a processor for controlling the memory and the communication interface, wherein the processor, upon receipt of an email message comprising a document for printing from a cloud server, wherein the email message includes an email address of the printer in "To" field of the email message and an email address of an additional recipient in "CC" or "BCC" field of the email message, prints the document upon receipt of the email message and wherein a notification related to the email message is provided to the additional recipient, the notification providing an option to a user to print, save or discard the document present in the email message.

12. A document printing system, comprising:
a processor;
a print management module that when executed causes the processor to
receive an email message comprising a document for printing on a cloud server, wherein the email message includes an email address of a printer in a "To" field of the email message and an email address of an additional recipient present in a "CC" or a "BCC" field of the email message;
transmit the email message to the printer and the additional recipient; and
wherein the document is printed at the printer upon receipt of the email message, and
wherein a notification related to the email message is provided to the additional recipient, the notification providing an option to a user to print, save or discard the document present in the email message.

* * * * *